Patented Oct. 9, 1934

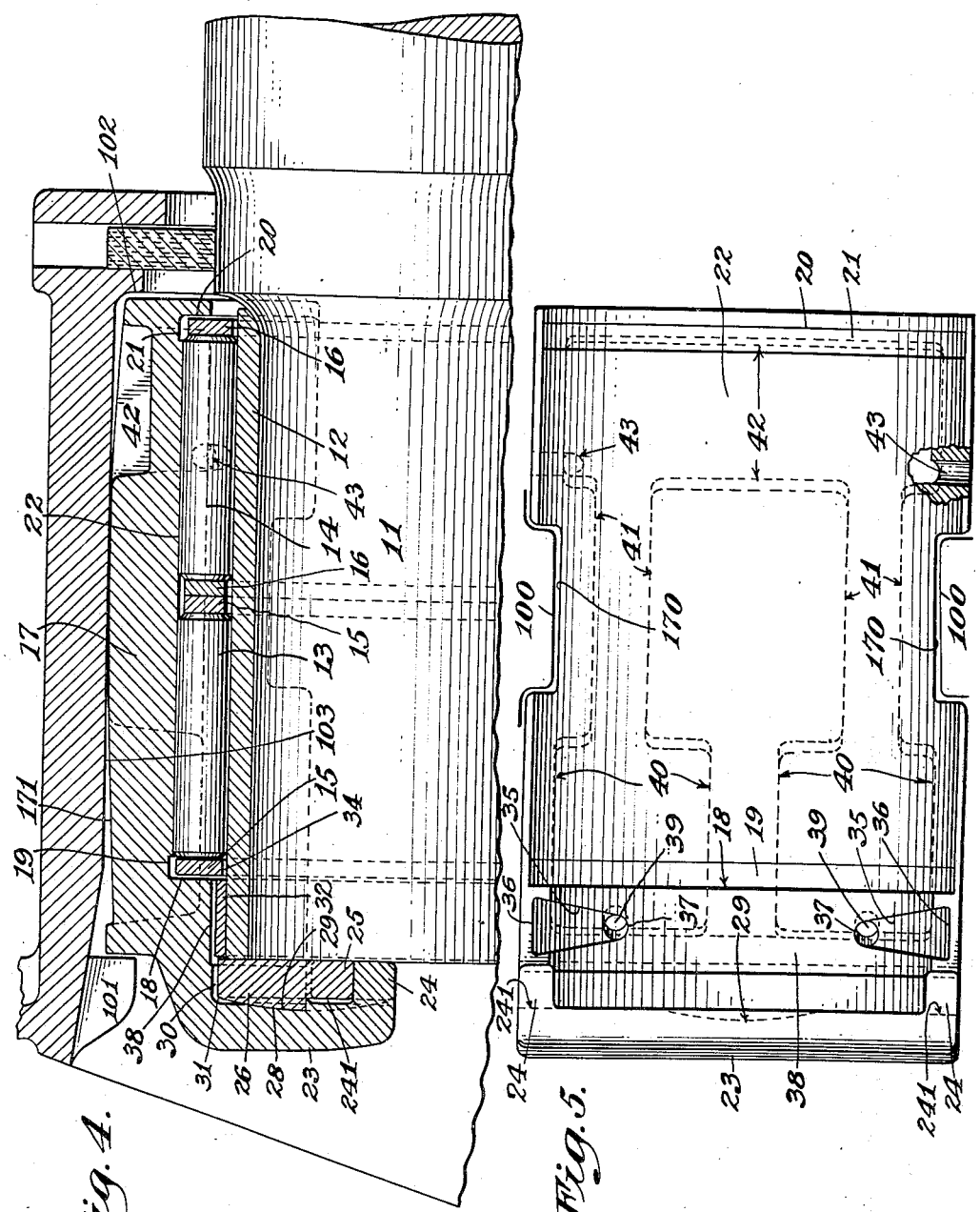

1,976,322

UNITED STATES PATENT OFFICE 1,976,322

ROLLER BEARING JOURNAL BOX

William Blackmore, Sharon, Pa., assignor to National Malleable and Steel Castings Company, Cleveland, Ohio, a corporation of Ohio Application July 1, 1930, Serial No. 465,169

16 Claims. (Cl. 308—180)

This invention relates to improvements in roller bearing journal box constructions of the general type disclosed in my pending application Serial No. 336,992, filed February 2, 1929. As in my prior application, the present invention has particular reference to devices of this sort, which may be readily substituted for the ordinary journal boxes employed in connection with standard American Railway Association car constructions. While the invention is especially applicable to the feeding of oil to roller bearings, and is herein disclosed as so applied, it is quite readily capable of broader application as to the lubrication of a plain bearing type of journal box and for this purpose only a few changes in the construction will be required.

A feature of the invention is the provision of an improved form of bearing member adapted to be fitted between the inner surface of the top of the journal box and the roller bearings provided at this portion of the unit. This member, in the improved form contemplated by the present invention, provides for the lubrication of the roller bearings in a more effective manner than has heretofore been possible. Oil which is picked up by an oil ring, rotatably mounted near the free end of the axle, is forced under positive pressure into a reservoir provided at the top of the member from which the oil may be subsequently fed through suitable openings to the bearing rollers. The pressure which serves to force the oil into the reservoir is brought about by the movement of the ring due to the peculiar form of and co-operative relationship between the same and the bearing member.

Another feature of the invention has to do with the provision of an improved arrangement of the parts for receiving the relative thrusts between the journal and the main housing, as well as the intermediate elements. In this connection a novel thrust block, adapted to co-operate with the end of the journal and with a portion of the roller bearing member, has been devised. This block is adapted for ball and socket engagement with the bearing member and is adapted to be retained in position on said member in a particularly simple and effective way as to be readily removable and insertable with respect to the same. The bearing member, furthermore, co-operates with the usual roller bearing retainer cages to hold the latter in proper position on the journal without the assistance of any intervening or intermediate parts.

Numerous other objects and advantages of the invention will appear from a detailed description of the same, which will now be given in conjunction with the accompanying drawings, in which:

Figure 4 is a longitudinal, sectional view taken along the broken line 4—4 of Figure 2, and Figure 5 is a bottom view of the bearing member having the roller raceway.

Figure 1:
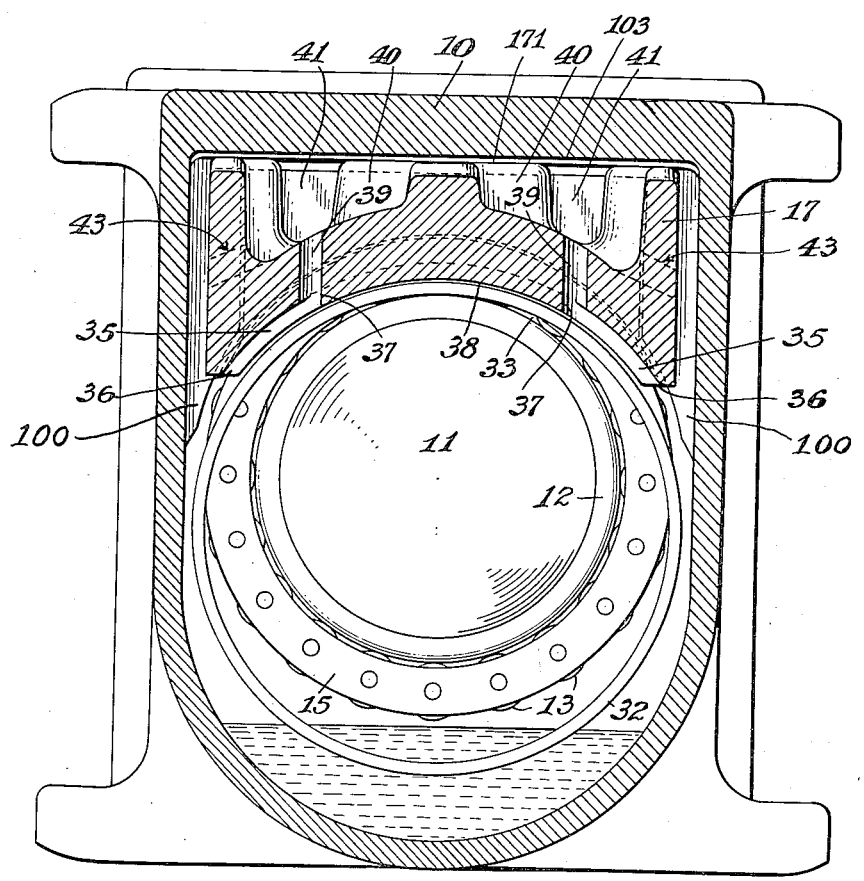
Figure 1 is a sectional view in elevation of a journal box embodying the features of the present invention.
Figure 2:
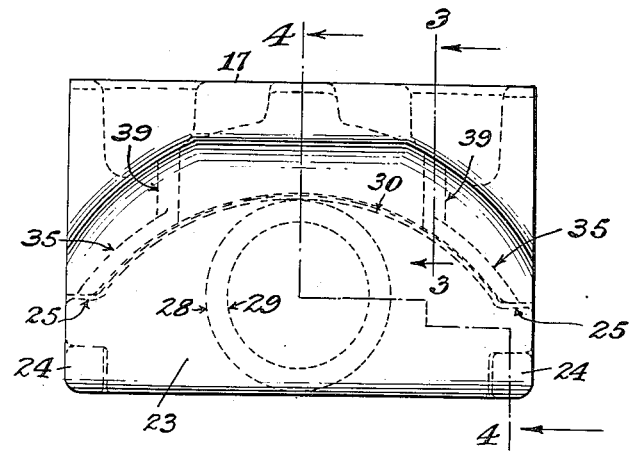
Figure 2 is a front, elevational view of the bearing member and thrust bearing block forming a part of the improved construction.
Figure 3:
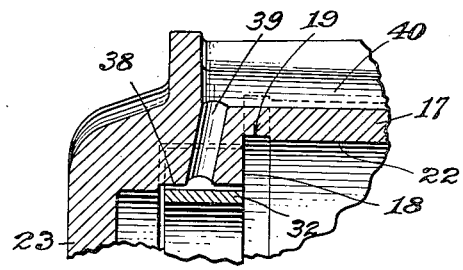
Figure 3 is a detailed, sectional view taken along the line 3—3 of Figure 2.

Referring now to the drawings, which disclose one admirable form of the invention the latter will now be described in detail. It is to be understood that the particular embodiment illustrated is specially applicable to a construction of the type disclosed in my prior application, hereinbefore mentioned, and that reference may be had to the prior application for co-operating features of the journal box which are not fully shown in the present drawings. Many of the parts disclosed in the present case are to be substituted for corresponding parts shown in my co-pending application.

Portions of the journal box housing 10 are shown in Figures 1 and 4. This housing is adapted to surround the journal or axle 11 in the usual way. A bearing sleeve 12 is preferably provided over that portion of the axle which is to co-operate with the roller bearing elements 13 and 14. In this way a suitable hard, wear-resisting bearing surface, which is replaceable, is carried by the journal. The outer series of rollers 13 is adapted to be mounted in the usual way in a cage provided with annular side elements 15 which support the opposite ends of the rollers. In a similar way the rollers 14 are mounted in a cage comprising annular side elements 16. The adjacent cage elements 15 and 16 as shown, are adapted to abut one another; if desired they might be made integral. In this event the two series of rollers would be carried by a single or unitary cage. For ease of assembly, however, they are preferably formed as separate units. It is to be noted that due to the elimination of the enlarged portion or shoulder at the end of the axle, the roller cages need not be formed in two half sections, as in the prior case, but may be formed as complete cylindrical members.

Between the inner surface of the top of the housing 10 and the surfaces of the rollers 13 and 14, there is provided a bearing member 17 which is adapted to partially enclose the roller elements and provide a raceway therefor. A shoulder 18 of the member co-operates with the forward surface of the cage element 15 to retain the forward rollers on the axle while a recess 19 in the member provides for adequate clearance above the cage element so that accurate machining at this point is not required. A similar arrangement at the inner end of the member provides for a shoulder 20 serving as a retainer for the inner cage element 16 while a clearance 21 above the cage element serves to avoid the necessity of accurate machining at this point. An arcuate surface 22 on the under side of the member, which is accurately machined to dimension, serves to provide a smooth raceway for the rollers 13 and 14. Preferably, the upper or outer surface 171 of the member is formed as an arc from the outer toward the inner end of the member so as to co-operate with the inner surface 103 of the housing in such a way as to permit vertical angling of the member and axle with respect to the box.

At its forward or outer end the member 17 is provided with a depending portion 23 having inturned sides 24 with openings 241 therein adapted to receive extensions 25 of a thrust bearing block 26. The latter is adapted to fit into a cavity formed between the in-turned sides 24 and the depending portion 23 of the member 17 and is provided with a convex or spherical surface 28 adapted to co-operate with a corresponding concave or spherical surface 29 of the portion 23. A clearance 30 is provided between the upper edge of the thrust block and the opposite under surface of the member 17 and a further clearance 31 is provided between the forward surface of the thrust block and the adjacent surface of the member. This construction provides for a ball and socket engagement between the depending portion of the member 17 and the thrust block 26 so that angling between these parts is permitted. Another advantage of this ball and socket construction is that the necessity of accurately machining the bearing surfaces is obviated. The convex and concave surfaces of the thrust block and portion 23 respectively need not be machined. Upon the first thrust engagement between the block and the end of the journal the spherical seating of the parts will carry the contacting surfaces of the block and journal into parallel planes. On the other hand if the block 26 were omitted so as to do away with the spherical seating of the parts it would be necessary to accurately machine the contacting surfaces of the portion 23 and the end of the journal to insure surface contact rather than point or line contact. The bearing member 17 is held against longitudinal movement within the journal box housing by co-operation of inwardly extending projections 100 (Fig. 5) of the journal box with cut out portions 170 at the sides of the member 17. Either in lieu of this construction or in addition thereto there may be provided, for this purpose, cooperation between a depending lug 101 of the housing and the forward end of the member and cooperation between a depending portion 102 of the housing and the inner or rear surface of the member. Through this construction and arrangement of the parts it will be clear that a thrust of the housing toward the right, in Figures 4 and 5, relative to the journal will be transmitted either or both by the projections 100 to the rear shoulders of the cut out portions 170 and by the lug 101 to the forward end of the member 17 and the latter in turn will act through the block 26 to transmit the thrust to the end of the journal. Thrusts in the opposite direction may be taken up in substantially the same way by a similar construction cooperating with the opposite end of the axle.

For the purpose of providing adequate lubrication for the roller bearings, a construction is employed which will automatically force oil under pressure into the reservoir, from which the oil may subsequently gravitate into the parts to be lubricated. For this purpose an oil ring 32 of the usual construction, adapted to surround the journal and the bearing sleeve 12 near the outer end thereof is adapted to have its lower portion immersed in a bath of oil contained in the bottom of the housing. This ring is of considerably larger diameter than the sleeve 12 and is adapted to be rotated through the oil bath upon rotation of the journal. Oil which is picked up by the inner surface of the ring is carried into the space 33 between the ring and the sleeve 12, which space is of constantly decreasing volume in the direction of the top of the journal. The result is that the oil which is continually carried up by the ring is squeezed between the ring and the sleeve 12 and is forced through the annular channel 34, provided by the clearance between the cage element 15 and the outer surface of the sleeve. This oil, therefore, is passed to the forward series of rollers 13. At the same time oil which is picked up by the outer surface of the ring 32 is carried into a wedge-shape opening or cutout portion of the member 17. This opening or cavity, as shown in Figure 5, tapers from the outer end 36 toward the inner end 37 and in this way the area of cross section of the passage through which the oil flows is gradually reduced. Furthermore, the construction is preferably such that the radius of the outer surface of the ring 32 is slightly less than the radius of the cooperating inner surface 38 of the member 17 but has its axis at a point slightly higher than the center of curvature of the surface 38 so that there is a slight convergence between the two surfaces. This construction serves several useful purposes. It has been found that if the two radii mentioned are made equal and the centers are coincident there is a tendency to evacuate all of the air between the outer surface of the ring 32 and the surface 38 so that the ring will be forced under considerable pressure against the bearing member and rotation of the ring will be arrested. This objectionable action is overcome by the provision of the unequal radii as stated. Furthermore this arrangement serves to provide for an additional restriction of the passage into which the oil is forced from the outer surface of the ring as the latter is rotated. As a result of this positive pressure action, which may be somewhat analogous to that of the Venturi tube, oil may be passed through a vertical channel 39, extending upwardly from the inner end 37 of the passage 35, into a reservoir 40 formed in the top of the member 17. This reservoir may be connected by a channel 41 with another reservoir 42 at the rear of the member 17. A passage 43 leading from the reservoir 42 may serve to supply oil to the inner set of rollers 14.

It will be understood that the halves of the journal box construction at the two sides of a vertical plane extending through the axis of the journal are substantially duplicated so that oil will be forced into the reservoir 42 regardless of the direction of rotation of the journal 11. As shown in Figure 5, the reservoir 42 preferably extends completely across the rear portion of the member 17 and is adapted to be supplied with oil through either of the pairs of channels 41 at the two sides.

By virtue of the construction disclosed it will be apparent that oil will be positively forced to produce proper lubrication of both the inner and outer series of rollers. The outer rollers are supplied directly by the oil which is squeezed from the inner surface of the oil ring whereas the inner rollers are supplied by the oil which is forced into the reservoir 42 from the outer surface of the oil ring in the manner explained. It has been found from actual tests that at ordinary running temperatures the pressure developed between the outer surface of the oil ring and the under surface of the member 17 is sufficient to force a column of oil in a tube to a point approximately 18" above the level of the oil in the reservoir of the member 17. This is obviously sufficient to insure proper lubrication at all times. In fact it would be possible, if desired, to lubricate the outer rollers as well as the inner rollers from the supply of oil forced into the reservoir by simply providing outlet ports from the reservoir chambers 40 to these outer rollers. It has also been found that the pressure developed between the inner surface of the bearing and the outer surface of the bearing sleeve 12 is sufficient to force the oil through both sets of rollers. Hence this source of lubrication might be relied upon entirely for both the inner and outer sets of rollers. However, in order that adequate lubrication under all conditions may be properly assured for both sets of rollers it is deemed preferable to rely upon the two actions mentioned to separately lubricate the two sets of rollers in the way initially disclosed.

The construction disclosed, furthermore, obviates the necessity of providing special retaining elements for the roller bearing cages. The bearing member 17 performs this retaining function and at the same time provides a spherical seat for the thrust block 26. In removing the bearing member the journal box is first slid off of the journal and the roller bearing units taken out. The bearing member may then be dropped until the cut-out portions 170 are free from the lugs 100 and the top of the bearing member is below the lugs 101 and 102. At this time the bearing member may be drawn out of the housing. In assembling the parts the steps are carried out in the reverse order.

While one admirable form of the invention has been disclosed in detail it will be understood that various changes may be made without departing from the principles and scope of the invention. The terms and expressions employed herein are to be considered merely as descriptive of the embodiment illustrated and are not to be regarded as imposing any limitations on the invention claimed.

What I claim is:

1. In a journal box structure a journal, a bearing member cooperating therewith having an oil reservoir at its top, an oil ring surrounding said journal cooperating with a portion of the under surface of said member, said portion and the outer surface of said ring having different radii and centers of curvature to provide a space between said surfaces converging toward the top of said ring, means on said member forming a restriction at the upper end of said space, and a passage for conveying oil forced into said space under pressure into said reservoir.

2. In a journal box structure a journal, a journal box housing, a bearing member having a roller raceway between said journal and housing and a thrust bearing block carried by said member, said block and member having cooperating support means permitting relative angling, to receive the outward thrusts of said journal, said block having a flat surface cooperating with the end of said journal and said member and block having spherical cooperating surfaces, one of said surfaces being convex and the other concave.

3. In a journal box structure a journal, a journal box housing, a bearing member having a roller raceway between said journal and housing, said member having an extension in front of the end of said journal and a thrust bearing block between said extension and journal end having a pair of lateral projections supported by said member, said block being adapted for radial action with respect to said member in the transmission of thrusts.

4. In a journal box structure a box housing, a journal therein, a bearing member providing a roller raceway between said journal and housing, a thrust block supported by said member adjacent the end of said journal, and a continuous oil conveying member surrounding said journal having its outer surface cooperating with a surface on said member to feed oil to the bearing surfaces, said block serving to retain said oil conveying member on said journal.

5. In a device of the class described, a journal box, a bearing member for roller bearings having thrust engagements with said box and provided with a depending outer end portion, an end thrust member interposed between the depending outer end portion of the bearing member and the end of the axle, said bearing member having recesses with converging sides, a revolving continuous oil conveying member cooperating with said recesses to produce a definite pressure of oil in said recesses, and ports leading from said recesses into an oil storage chamber in said bearing member, said thrust member serving as a retainer for said oil conveying member.

6. In a journal box structure, a bearing member cooperating therewith, having an oil reservoir at its top, a continuous oil conveying member surrounding said journal cooperating with a surface on said member, said surface and the outer surface of said oil conveying member having different radii and different centers of curvature to provide a space between said surfaces constricted toward the top of said oil conveying member, and a passage for conveying oil forced into said space under pressure into said reservoir.

7. In a journal box, an oil reservoir, a journal, a bearing member above the journal, an arcuate groove in said bearing member facing said journal, a continuous oil conveying member supported and rotated by said journal in the plane of said groove, said oil conveying member and groove forming a chamber for receiving oil carried by said oil conveying member, said chamber having an intermediate constricted portion, and an oil passage leading from said chamber adjacent each end of the constricted portion.

8. In a roller bearing journal box construction including a continuous oil conveying member, a bearing member including a raceway, means adjacent the end of the journal for supporting a thrust block, said bearing member being provided with a surface constructed and arranged above said oil conveying member to cooperate therewith for forcing oil to a level above the top of said conveying member, and means for feeding said oil to the bearing surfaces.

9. In a construction of the character described including a journal box and a continuous oil conveying member, a bearing member having portions adapted to engage said box to take thrusts, a depending outer end portion adapted to receive and support a thrust block and to provide for radial action between said thrust block and bearing member, an oil chamber in the top of the member, means formed on the member and adapted to cooperate with the oil conveying member for raising oil under pressure to a level above the topmost part of the oil conveying member and storing it in said chamber.

10. In a journal construction including a journal box, a journal, and a continuous oil conveying member, a bearing member provided with a depending outer end portion adapted to support a thrust block and to retain the oil conveying member between said depending portion and another portion of the construction, said bearing member having recesses with converging walls opposite the oil conveying member and cooperating therewith to produce an oil pressure for forcing oil upwardly through ports into a chamber formed in the top of said bearing member above the top of the oil conveying member.

11. In a device of the class described, a journal box, a bearing member having a raceway for roller bearings and projections forming thrust engagements with said box, a depending outer end portion formed on said bearing member and adapted to receive a thrust member interposed between said depending portion and the end of the journal, a continuous oil conveying member hung on the outer end of the journal, said bearing member having recesses cooperating with said oil conveying member to force oil under pressure to a storage chamber formed in said bearing member, to a level above the top of said conveying member and means for distributing oil from said chamber to the roller bearings, said oil conveying member and bearing member cooperating to feed oil directly to said roller bearings adjacent the top of the oil conveying member.

12. In a bearing structure a journal, a bearing member cooperating with said journal, said member being provided at its top with an oil reservoir for distributing oil over said journal, and a continuous oil conveying member surrounding said journal and adapted to be rotated thereby, said oil conveying member and said bearing member having cooperating surfaces converging in the direction of movement of said oil conveying member to squeeze oil into said reservoir.

13. In a journal box structure a journal, a bearing member having an oil reservoir therein for distributing oil over said journal, and a continuous oil conveying member surrounding said journal and rotatable thereby, the outer surface of said oil conveying member cooperating with an adjacent arcuate surface on the under side of said bearing member to squeeze oil adhering to said ring into said reservoir.

14. In a journal box structure, a journal box housing, a journal, a bearing member, an oil reservoir in said member above said journal for distributing oil over said journal, said reservoir having an opening leading substantially into the bottom thereof, an oil reservoir at the bottom of said housing, a continuous oil conveying member adapted to be rotated through the oil in said last mentioned reservoir, and adjacent arcuate surfaces cooperating between said oil conveying member and the bearing member to force oil under pressure into said first mentioned reservoir through said opening.

15. In a roller bearing journal box structure a journal box housing, a journal therein, a bearing member within said housing having a reservoir therein for distributing oil over said journal, roller elements cooperating with said member and journal, said member having a machined surface spaced by said rollers a definite distance from said journal, and a continuous oil conveying member adapted to rotate between said journal and said surface and forming a passage converging in the direction of movement of the oil conveying member toward the top of the oil conveying member, rotation of said oil conveying member serving to force oil under pressure from said passage through an opening in said bearing member into said reservoir.

16. In a journal box structure a bearing member having an oil reservoir therein for distributing oil over the bearing surface of said member, said member having an opening at each side leading into said reservoir and an arcuate groove in the undersurface of the member on each side of the axis of the journal having walls converging toward said openings, means on said member forming a restricted passage between said grooves, and an oil conveying member cooperating with said bearing member to force oil into one or the other of said groves, depending upon the direction of movement of said conveying member, and through the corresponding openings into the reservoir.

WILLIAM BLACKMORE.